United States Patent [19]

Lothammer

[11] Patent Number: 4,926,723

[45] Date of Patent: May 22, 1990

[54] MACHINE TOOL AUXILIARY FUNCTION HYDRAULIC SYSTEM

[75] Inventor: Henry Lothammer, Manlius, N.Y.

[73] Assignee: Ralph Earl Co., Inc., Syracuse, N.Y.

[21] Appl. No.: 280,571

[22] Filed: Dec. 6, 1988

[51] Int. Cl.$^5$ .......................... B23B 23/00; B23B 7/04
[52] U.S. Cl. ........................................ 82/118; 82/120; 82/148
[58] Field of Search ................. 82/148, 159, 118, 119, 82/120, 121

[56] References Cited

U.S. PATENT DOCUMENTS

| | | | |
|---|---|---|---|
| 3,198,042 | 8/1965 | Binns | 82/148 |
| 3,581,611 | 6/1971 | Lentz | 82/148 |
| 4,335,633 | 6/1982 | Boffelli | 82/148 |
| 4,507,993 | 4/1985 | Silverman et al. | 82/159 |
| 4,621,551 | 11/1986 | Silverman | 82/148 |
| 4,751,864 | 6/1988 | Leigh et al. | 82/148 |
| 4,807,501 | 2/1989 | Leigh et al. | 82/148 |

*Primary Examiner*—William Terrell
*Attorney, Agent, or Firm*—Wall and Roehrig

[57] ABSTRACT

An auxiliary-function hydraulic system is provided for a computerized numerical control (CNC) machine tooling unit. Hydraulic power is provided for locking collet or chuck to an open or closed position and providing an affirmative collet-open and/or collet-closed signal to communicate the collet position to the host computer. The tailstock can be brought gently forward to contact a workpiece and can be returned rapidly to the home position, with a break-away pressure feature being employed to overcome initial static friction. A pressure switch indicates that the tailstock is in position against the workpiece. A spindle brake applies braking to the spindle to stop the same from high speed either on command or in the event of system failure. In the latter case, braking occurs prior to loss of pressure to the collet closer cylinder. Also, a turret clamp locks and unlocks a tool changer turret.

5 Claims, 5 Drawing Sheets

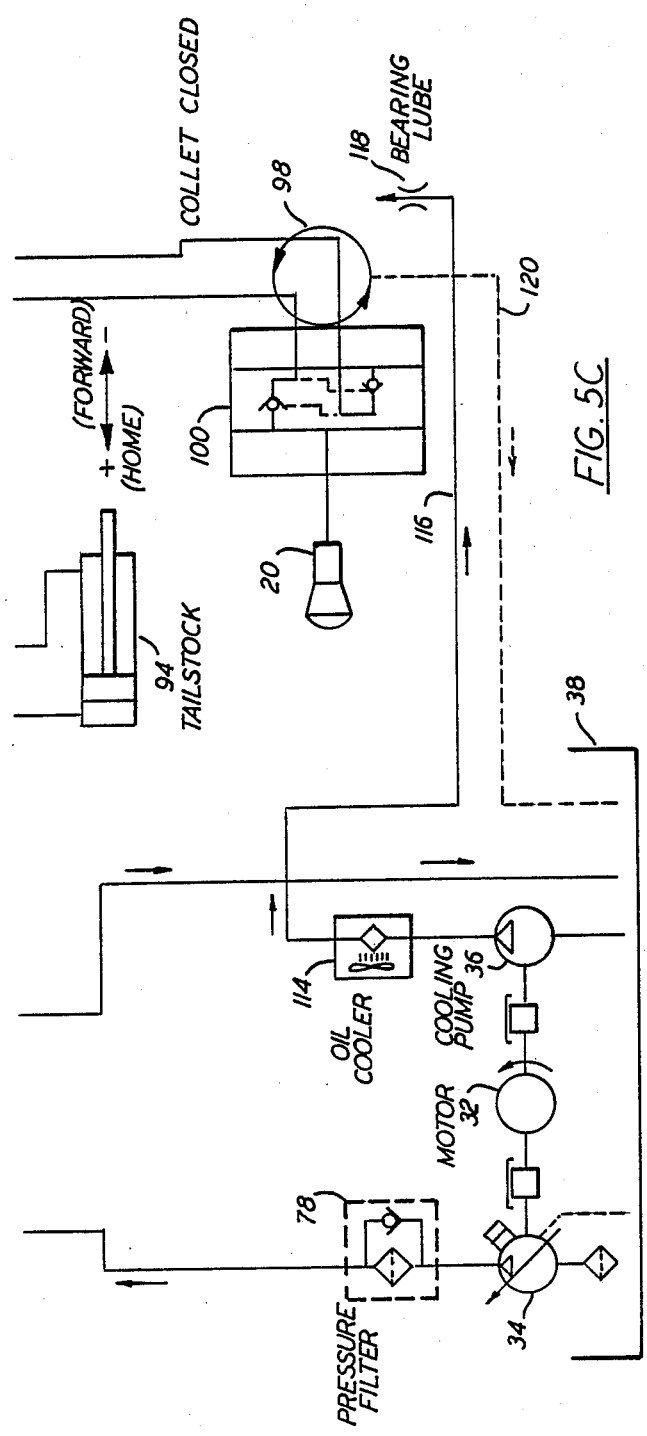
FIG. 5C
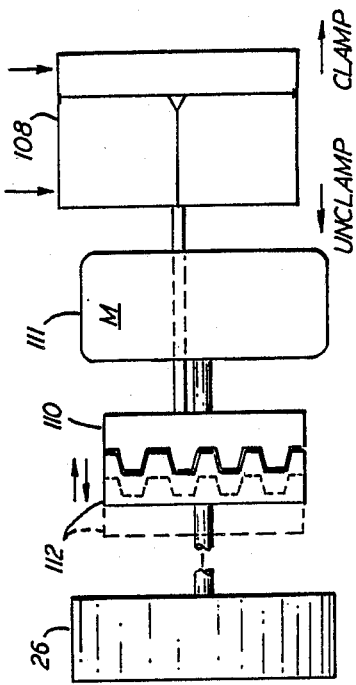
FIG. 6
FIG. 5
| FIG. 5A | FIG. 5B |
|---|---|
| | FIG. 5C |

MACHINE TOOL AUXILIARY FUNCTION HYDRAULIC SYSTEM

BACKGROUND OF THE INVENTION

This invention relates to hydraulic systems which are employed in automatic machining equipment. The present invention is more particularly directed to a hydraulic system for a machining device which has a rotary spindle that has an openable and closable collet or chuck, a tailstock slide that contacts and supports a workpiece in the collet or chuck, a tool selection turret, and a spindle brake, all of which are hydraulically actuated and all of whose conditions can be hydraulically monitored. Preferably, the machining device can be a computerized numerically controlled (CNC) machine tooler, of which there are several well known designs.

CNC machinery equipment enjoys the advantages of fast machine cycle times, high precision, consistent dimensional accuracy, flexibility of operation, and ease in programming to machine any specific workpiece automatically into a finished, machined product.

Generally, the machining equipment has an enclosure or cabinet, which holds the machining tools and also confines any metal dust or by-product, and also maintains an even temperature to preclude loss of accuracy due to thermal expansion.

Within the cabinet there is a spindle which holds a collet, chuck, or jaw into which a workpiece or part is secured for a machining operation. The collet is automatically opened and shut. A spindle brake is automatically applied when required to halt rotation of the spindle. A tailstock slide moves hydraulically between a home position remote from the associated workpiece, and a forward position with the tailstock against and supporting the workpiece. A turret clamp prevents the turret from rotating out of position when a tooling operation is carried out, but is moved to an unclamp position when it is necessary to rotate the turret to bring another tool into position.

The machine tool industry has long sought a simple, but reliable hydraulic system that performs the necessary functions, and also provides positive signals to indicate collet open and closed condition, spindle brake actuation, tailstock position and system pressure. Control and signal of the tailstock is especially important so that the tailstock can be brought with gentle but firm pressure against the workpiece to permit handling of light, fragile parts as well as heavy, lengthy, or bulky workpieces. However, until this invention, no completely suitable hydraulic system has been provided for automated machining equipment.

OBJECTS AND SUMMARY OF THE INVENTION

Accordingly, it is an object of this invention to provide a modular hydraulic system for an automated machine tool unit which avoids drawbacks of the prior art.

It is a more specific object of this invention to provide a hydraulic system which automates power and control of critical machine functions in a CNC machining device.

It is a more particular object of the invention for the hydraulic system to provide total hydraulic power on demand; automated control of tailstock forward and home movement; provision of tailstock-in-position signal to communicate to the CNC host computer that the tailstock is in contact with the workpiece; collet-open and collet-closed signals to communicate to the host computer that the collet is in its respective open or closed position; application of spindle brake pressure automatically to stop the spindle from high speed, even in the event of system failure; brake-on signal to communicate to the host computer that the spindle brake is being applied; and automatic turret clamp/unclamp to lock or unlock the turret for tool selection and automatic signalling that hydraulic pressure exists.

In addition, it is an object of this invention for the hydraulic system to include tailstock speed control and break-away pressure features, as well as increased movement speed to the home position for faster cycle time.

In accordance with one aspect of this invention the hydraulic assembly has a hydraulic circuit that includes a reservoir, a hydraulic pump, a pressure supply line carrying pressurized hydraulic fluid from the pump, a return line carrying fluid to the reservoir, an accumulator coupled to the supply line for storing a quantity of the fluid substantially at the pressure of the pump.

When the hydraulic system is powered up, the variable speed pump senses the immediate demand of pressure and flow. The variable-speed system pump delivers maximum flow to bring system pressure up to full capacity, then reduces output automatically to maintain set pressure. In addition, the pump charges a hydraulic accumulator which supplements instantaneous system power demands which the pump could not satisfy on its own. The system pressure is communicated to a circuit manifold, which also connects to the tank or reservoir.

A tailstock cylinder assembly has a cylinder coupled to the tailstock slide, the cylinder being double acting, with first and second hydraulic ports or connections, and a tailstock valve coupled between the first and second ports and the supply and return lines. The tailstock valve is preferably actuable from a neutral position to either of a forward position or a home position. A tailstock pressure regulator between the supply line and the tailstock valve provides reduced hydraulic pressure through the valve to the cylinder. A pressure sensor coupled to the first hydraulic port senses the hydraulic pressure on the cylinder. This sensor detects a pressure drop that indicates the tailstock has contacted the workpiece, and then supplies a tailstock-in-position signal to the computer.

A bypass valve selectively bypasses the tailstock pressure regulator momentarily to overcome static friction. Also an adjustable orifice between the tailstock valve and return line controls the travel speed of the tailstock slide to the forward position, but can be bypassed to permit rapid travel to home.

A pair of pressure detectors are also associated with a hydraulic cylinder used to open and close the collet. Here a collet valve is actuable to move between a collet-open and a collet-closed position. The pressure detectors respectively give positive signal indications when the cylinder reaches the end of its travel to communicate to the computer that the collet is fully opened or closed.

The spindle brake is also cylinder actuated, In the preferred embodiment, the spindle brake employs a single acting cylinder that is pressure-closed and spring-opened. Here also, a pressure detector at the hydraulic port to the brake cylinder gives an affirmative indication that the brake is being applied. In this embodiment, a brake valve has a normal condition in which pressure is applied from the supply line to the valve, and an actuated condition in which pressure is relieved and the cylinder is coupled to the return line. Thus, pressure is applied to the spindle brake when the valve is not actuated. This means that if there should be a system failure, the brake valve will return immediately to the unactuated brake-closed condition, and hydraulic pressure will continue to be applied from the accumulator to the brake cylinder. This halts spindle rotation prior to the time that pressure to the collet cylinder is lost.

The tailstock function station has an independent pressure regulator to enable control of tailstock force over a wide range. This enables handling of light, fragile workpieces as well as heavy, lengthy and bulky workpieces. The tailstock function also employs a two-speed selector to enable a rapid-approach, slow-down-before-contact, feature. This allows faster cycles, while keeping contact shock on the workpiece minimized. At low tailstock pressures inherent friction in the mechanism will prevent the tailstock accelerating. This friction is overcome by application of high pressure. The high pressure bypass valve is first energized, then returns to low pressure until contact is made on the workpiece. The pressure sensors detect when the tailstock slide has made contact with the workpiece, regardless of workpiece length or pressure requirements. Contact is detected by a sudden drop of pressure in the return flow from the hydraulic cylinder which powers the slide. The pressure drop is caused by the slide stalling against the workpiece, so that as a result, the return flow stops. The absence of flow across a sensing orifice under the speed control valve causes return-side pressure to drop off. In the preferred embodiment, a pressure switch changes state and signals that the tailstock slide is no longer in motion, i.e., that the tailstock is therefore in position.

The collet function station has an independent pressure regulator to make available a wide range of chucking forces. The hydraulic valve that controls the collet-open and collet-closed modes has mechanical memory to ensure that the collet does not change state after power shut-down or power-up.

The spindle brake is engaged by de-energizing the brake valve, which is a solenoid valve. Hydraulic pressure is communicated to the brake pad which then grabs the disk or rotor, thereby stopping and locking the spindle. The brake will engage even in the event of a power loss, as the energy charged in the hydraulic accumulator will communicate to the brake pad and stop the spindle.

A lubrication system automatically lubricates the high speed spindle bearings. This system uses some of the return system fluid to lubricate without using any additional power from the main system. A clear Teflon capillary tube ties into the main system fluid return and communicates up to the spindle bearing housing. The small hydraulic pressure forces just enough fluid up to the bearing. The clear capillary permits quick, visual inspection of lubricating fluid flow.

To ensure a cool, consistent operating hydraulic system temperature, an auxiliary pumping system is employed to circulate hydraulic fluid to a forced-air heat exchanger. The heat exchanger is located and mounted remotely. All hydraulic connectors and hose are furnished as an integral part of the hydraulic assembly. The hose is simply routed to the heat exchanger and connected to the hose ends. The heat exchanger forced air fan and motor are powered from a pre-installed cable.

The above and many other objects, features, and advantages of this invention will be more fully appreciated from the ensuing description of a preferred embodiment, which should be read in connection with the accompanying Drawing.

BRIEF DESCRIPTION OF THE DRAWING

FIG. 6 is an enlarged detail of a portion of the schematic of FIG. 5.

DETAILED DESCRIPTION OF THE PREFERRED EMBODIMENT

Figure 1:
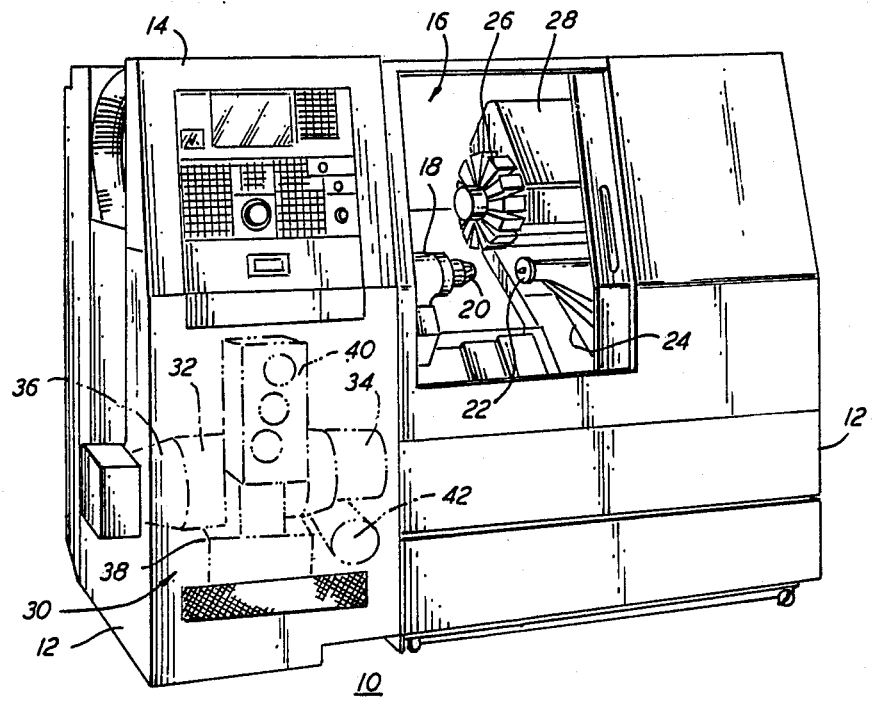
FIG. 1 is a perspective view of a typical automated machine tooler unit which employs a hydraulic system according to one preferred embodiment of this invention.

With reference to the Drawing, and initially to FIG. 1 thereof, a computerized numerical control (CNC) precision automated tooling machine unit 10 provides the environment for the hydraulic system of this invention. A housing 12 of the unit has a front control panel 14 which permits programming and monitoring of the machining operations. To the right of the control panel 14 is an enclosure 16 where the machining and tooling take place. Here a spindle 18 holds a chuck or collet 20 in which a workpiece (not shown) can be mounted. A tailstock 22 is mounted on a tailstock slide 24 for horizontal movement. The tailstock 22 can be brought from a home position remote from the spindle 18 to a forward position in contact with the workpiece on the chuck or collet 20. Above the spindle 18 and tailstock 22 is a multi-position tool turret 26, which can have e.g. ten or twelve rotary positions, and can be capable of either passive or live tooling. The CNC unit 10 can be programed to rotate the turret 26 into position to employ any given tool thereon. The turret 26 is mounted on a carriage 28 to provide both lateral and transverse movement of the turret 26 and its tools.

Figure 2:
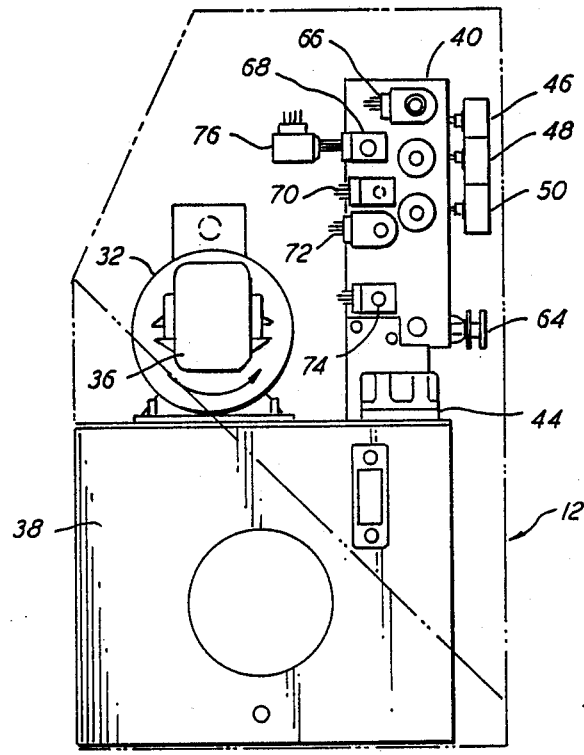
FIGS. 2, 3 and 4 are a left side elevation, a front side elevation, and a right side elevation, respectively, of the hydraulic system of the preferred embodiment.
Figure 3:
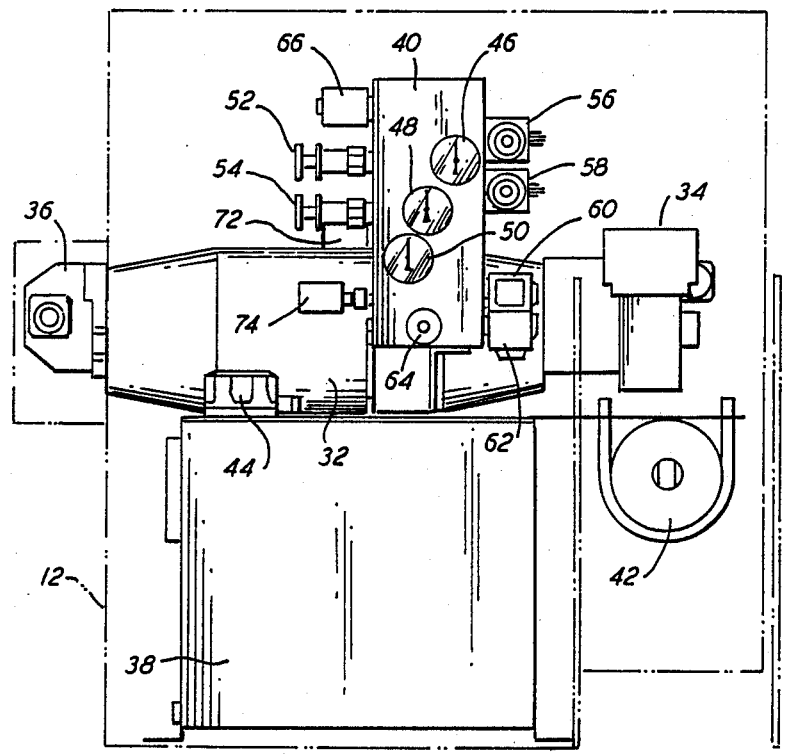
Figure 4:
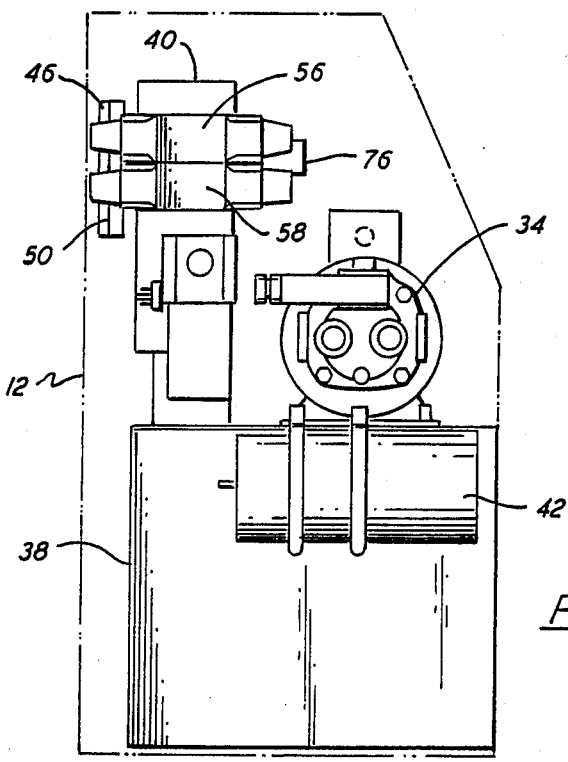

An auxiliary hydraulic system 30 according to an embodiment of this invention is shown in ghost line within the housing 12 of the CNC unit 10, and is shown in more detail in FIGS. 2, 3, and 4. In the system 30, a motor 32 drives a variable speed hydraulic pump 34 as well as a cooling pump 36. A reservoir tank 38 is disposed beneath the motor and pumps, and a distribution manifold 40 or tower is mounted in front of the motor 32. A hydraulic pressure accumulator 42, here of about 60 cubic inches volume, and mounted within the housing 12 is precharged with dry nitrogen to about 250 psig, and provides stored bursts of hydraulic energy on demand.

Referring now to FIGS. 2, 3, and 4, the hydraulic system 30 is illustrated in greater detail. A fill cap 44 is situated to one side of the reservoir 38. A collet pressure gauge 46, a tailstock pressure gauge 48, and a system pressure gauge 50 are situated on a front surface of the manifold tower 40. A collet pressure adjustment control 52 and a tailstock pressure adjustment control 54 are constituted by hand wheels situated on one side of the tower 40. A collet solenoid hydraulic valve 56 and a tailstock solenoid hydraulic valve 58 are mounted on the other side of the tower, as is a spindle brake valve 60 and a tailstock-speed-select solenoid valve 62. A tailstock feed control handwheel 64 is situated on the front of the manifold tower 40 beneath the system pressure gauge 50.

A turret unclamp valve 66, a collet-open pressure switch 68, a tailstock-in-position pressure switch 70, a tailstock pressure by-pass valve 72, and a spindle brake pressure switch 74 are situated on the side of the manifold tower 40 behind the controls 52 and 54. A collet-closed pressure switch 76 is mounted on a back surface of the manifold tower 40.

Figure 5A:
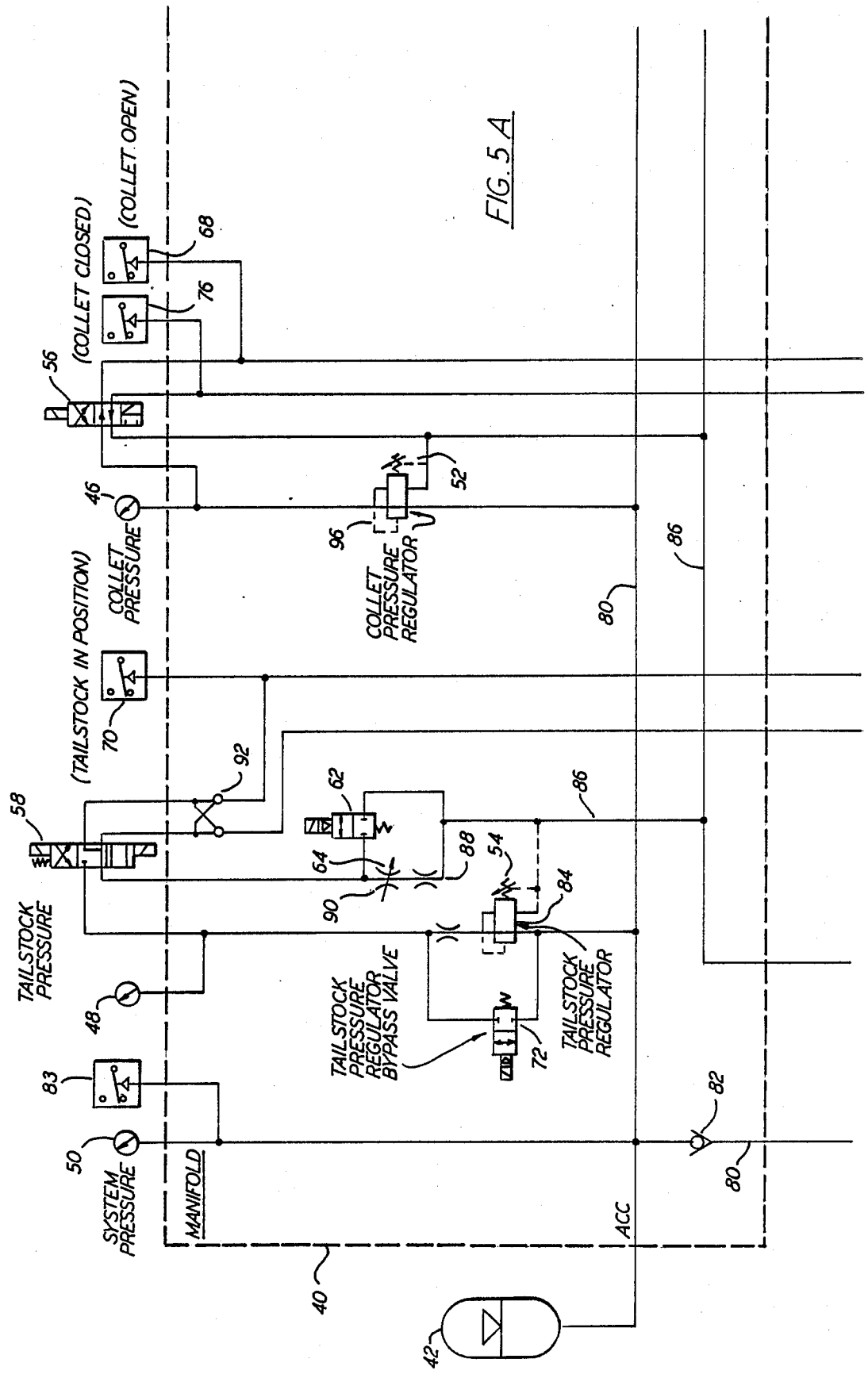
FIG. 5, formed of FIGS. 5A, 5B, and 5C, is a hydraulic circuit schematic according to the preferred embodiment.
Figure 5B:
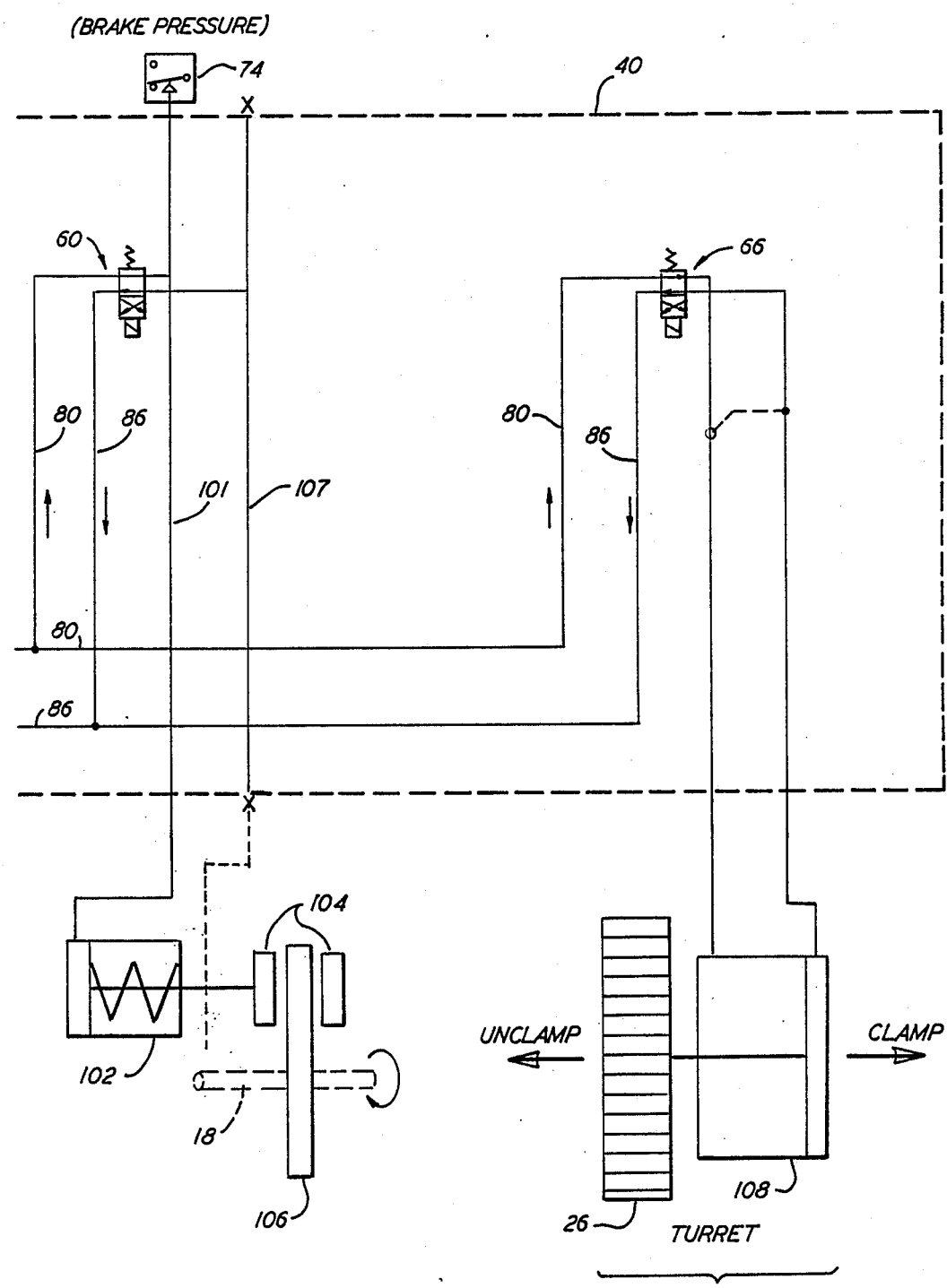

There are numerous hydraulic hoses, connections, cylinders, and ancillary equipment associated with the hydraulic system 30, but not shown in detail in these three Drawing figures. However, their function and connection will be self-evident from the schematic of the hydraulic circuit as shown in FIG. 5, formed of FIGS. 5A and 5B.

Assuming an adequate fill of a suitable hydraulic oil in the reservoir tank 38, the pump 34 draws the oil from the reservoir 38 and pumps it through a pressure filter 78 into a pressure supply line 80. The pump 34 has a compensator set preferably at about 500 psi, and should be capable of a flow rate of at least 3 gpm. The oil in the supply line 80 passes a check valve 82 and enters the accumulator 42, which charges up until the internal gas pressure equals the hydraulic pressure, namely 500 psi. The system pressure gauge 50 is connected at this point, as is a system pressure switch 83. The latter provides a system pressure signal to the system computer to indicate that sufficient hydraulic pressure exists in the supply line 80.

The supply line 80 is coupled to the tailstock valve 58 through a tailstock pressure regulator 84. This regulator 84 has an output pressure that is adjustable from about 50 to 500 psi, as determined by the setting of the control 54 which is associated with it. This controls the amount of force applied to the tailstock 22 so that the tailstock can be urged with greater force against large or bulky workpieces, or with smaller force against light, delicate workpieces. A calibrated orifice is situated at the output side of this pressure regulator 84. The tailstock pressure bypass valve 72 is coupled hydraulically around the regulator 84, and can be opened momentarily when full pressure is needed to overcome static friction. The tailstock pressure gauge 48 is connected between the regulator 84 and the tailstock valve 58.

The tailstock valve 58 is a double-action solenoid valve with a central neutral position, that position being assumed when neither solenoid is actuated. A return line 86 returns the hydraulic fluid to the reservoir 38 from a calibrated orifice 88 and an adjustable hydraulic resistance 90 connected to the tailstock valve 58. The resistance to return flow is controlled and adjusted by means of the tailstock feed control 64 to adjust the travel speed of the tailstock 22. The tailstock speed select solenoid valve 62 is coupled around the resistance 90 and the orifice 88, and is actuated when the tailstock 22 is to be moved in the home direction to permit rapid return to home.

Connections on the cylinder side of the tailstock valve 58 are coupled through check valves 92 to respective hydraulic ports on a tailstock cylinder 94 that serves as the prime mover for the tailstock slide 24. The tailstock in position pressure switch 70 is hydraulically coupled to one of these hydraulic ports. The switch 70 activates when the system is in the tailstock forward mode, that is, when hydraulic fluid is urged out from the forward side of the cylinder 94. When the tailstock 22 reaches the workpiece, the cylinder 94 will stall, causing a pressure drop that is sensed by the pressure actuated switch 70. The switch 70 then gives a positive indication that the tailstock 22 has contacted the workpiece. This is supplied to the computer used for controlling the CNC unit 10, which cuts off the current to the solenoid of the valve 58, halting tailstock movement.

The supply line 80 is connected through a collet pressure regulator 96 to the collet valve 56 and the return line 86 is also coupled thereto. The collet pressure regulator 96, which is adjustable in output pressure from about 50 to 500 psi, can be adjusted by means of the collet pressure adjustment control 52. The collet pressure gauge 46 is connected between regulator 96 and the valve 56. A pair of fluid conduits connected to the cylinder side of the valve 56 couple through a rotary coupling 98 to a double-acting collet cylinder 100, which can be moved hydraulically to open or close the collet 20 or chuck or jaw that is carried on the spindle 18. The collet-open switch 68 and collet-closed switch 76 are coupled to respective hydraulic ports on the cylinder 100. These each close when the cylinder pressure exceeds a predetermined threshold to indicate that the cylinder 100 has stalled in the fully open or fully closed state of the collet 20. These two pressure switches 68 and 76 provide affirmative signals to the CNC computer as to the status of the collet 20, chuck or jaw.

The supply and return lines 80, 86 are also connected through the spindle brake valve 60 to a hydraulic conduit 101 leading to a hydraulic port of a single-acting spindle brake cylinder 102. The brake pressure switch 74 is also coupled to this conduit 101. In this configuration, when the brake valve 60 is actuated, the cylinder 102 is connected to the return line 86 and is connected to the supply line 80 when the brake valve 60 is deenergized. Consequently, the brake system is normally pressure-applied, with the cylinder 102 urging brake pads 104 against a brake disc 106 associated with the spindle 18. The brake pressure switch 74 becomes actuated when the pressure in the cylinder 102 exceeds a threshold level that is greater than the spring pressure, in this embodiment about 60 psi. Thus, the switch 74 gives an affirmative indication that the brake 104, 106 is being applied.

In an alternative arrangement, a here-unused line 107 could be connected to the brake cylinder 102 there reconfigured so that the brake is spring applied and pressure opened. In that case, the pressure switch 74, also reconnected to the line 107, would be configured to close on a drop in pressure.

However, with the illustrated configuration, that in the event of system failure the solenoid actuated valve 60 would return to the normal, braking condition, and there would be sufficient energy reserve in the accumulator 42 to operate the cylinder 102 and brake the spindle 18 within about one revolution. This would ensure that the spindle would halt rotation prior to the time that pressure is lost in the collet cylinder 100. This prevents the spindle from throwing the workpiece.

The supply and return lines 80 and 86 are further coupled through the turret valve 66 to a double-acting turret cylinder 108 which serves to clamp or unclamp the turret 26. As shown in more detail in FIG. 6, the turret 26 has associated with it an axially fixed, but rotationally movable crown clamp member 110, and a servo motor 111. The turret cylinder urges a rotationally fixed, but axially movable mating crown clamp member 112 into and out of locking engagement with the clamp member 110. The crown clamp members 110, 112 are shown in solid line in engagement, i.e., in the clamp position, and in broken line in a disengaged or unclamp position. When a particular tool on the turret 26 is to be selected, the turret valve 66 is actuated to move the cylinder 108 to the unclamp position, after which the servo motor 111 rotates the turret 26 a programed amount to the position of the tool that has been identified in the CNC computer program. Then, the valve 66 is released to its normal position, and the crown clamp members 110, 112 move together to lock the turret in a rotationally fixed position, so that the tool is held securely in place.

Returning to FIG. 5, a cooling and lubricating system is shown in which the cooling pump 36 pumps the hydraulic oil at a relatively low pressure through an oil cooler 114. The oil cooler is preferably in the form of a finned-tube, forced air heat exchanger coil, having an associated fan. The outlet of the cooler is coupled to the return line 86, so that some of the oil flows directly back into the reservoir 38, while the remainder of the oil flows through a lube line 116 to a clear capillary bearing lube outlet 118 for lubricating the bearing of the spindle 18. The hydraulic oil that proceeds from the lube outlet 118 reaches an additional return line 120 to return this bearing lubricating oil to the reservoir. Leakage hydraulic oil from the rotary coupling 98 also returns via the return line 120 to the reservoir 38.

The entire hydraulic system 10 described above can be packaged with all electrical conductors and all hydraulic connections installed and functional. Installation of the system onto a CNC machine tool unit can be achieved by simply placing it onto threaded mounting studs and fastening it down, with all of the electrical and hydraulic connections being simply routed to corresponding actuators and cylinders, without requiring any additional hardware. As for the oil cooler 114, it can be located remotely or at any convenient location on the unit 10.

While the present invention has been described in detail with respect to a single preferred embodiment, it should be understood that the invention is not limited to that precise embodiment, rather, many modifications and variations would present themselves to those of skill in the art without departing from the scope and spirit of this invention, as defined in the appended claims.

What is claimed is:

1. Modular hydraulic assembly for an automated machine tooler of the type that has a rotary spindle that carries a collet into which a workpiece can be secured, a tailstock which is movable forward to contact said workpiece and movable away from the workpiece to a home position, a spindle brake which is held out of engagement with said spindle to permit rotation thereof and is urged into braking engagement with said spindle to halt said rotation, and a rotary tool turret for holding a plurality of tools at respective rotary positions thereon, said turret being rotatable to bring a desired one of said tools into position to machine said workpiece, including a turret clamp which is movable between an unlock position to permit rotation of the turret and a lock position to hold the turret against rotation; said modular hydraulic assembly comprising a hydraulic circuit which includes a reservoir, a hydraulic pump, a pressure supply line carrying pressurized hydraulic fluid from said hydraulic pump, a return line carrying fluid to said reservoir, an accumulator coupled to said supply line for storing a quantity of said fluid substantially at the pressure of said pump; and a tailstock cylinder assembly which comprises a cylinder coupled to said tailstock and having first and second hydraulic connections to be coupled to said supply and return lines; a tailstock valve coupled between said supply and return lines and the hydraulic connections of said cylinder, and having forward position, a neutral position, and a home position, in said forward position said return line and said supply line being connected respectively to said first and second hydraulic connections, and in said home position said supply line and said return line being connected respectively to said first and second hydraulic connections a tailstock pressure regulator disposed between said supply line and said valve providing a reduced hydraulic pressure through said valve to said cylinder; pressure sensing means for sensing the hydraulic pressure at said first hydraulic connection of said tailstock cylinder for detecting a pressure drop thereat to indicate contact of the tailstock with said workpiece and supplying a tailstock-in-position signal; and means actuating said tailstock valve in response to said tailstock-in-position signal to halt movement of said cylinder when said tailstock contacts said workpiece.

2. The modular hydraulic assembly of claim 1 further comprising a turret clamp cylinder coupled to said turret clamp to urge it between its lock and unlock positions, and having first and second hydraulic connections; a turret valve coupled between the supply line and return line and the first and second hydraulic connections of said turret clamp cylinder, with an unactuated condition respectively linking the supply and return lines to the first and second hydraulic connections and an actuated condition respectively linking the supply and return lines to the second and first hydraulic connections, such that in the unactuated condition of the turret valve, said turret clamp is held in its lock position.

3. Modular hydraulic assembly for an automated machine tooler of the type that has a rotary spindle that carries a collet into which a workpiece can be secured, a tailstock which is movable forward to contact said workpiece and movable away from the workpiece to a home position, a spindle brake which is held out of engagement with said spindle to permit rotation thereof and is urged into braking engagement with said spindle to halt said rotation, and a rotary tool turret for holding a plurality of tools at respective rotary positions thereon, said turret being rotatable to bring a desired one of said tools into position to machine said workpiece, including a turret clamp which is movable between an unlock position to permit rotation of the turret and a lock position to hold the turret against rotation; said modular hydraulic assembly comprising a hydraulic circuit which includes a reservoir, a hydraulic pump, a pressure supply line carrying pressurized hydraulic fluid from said hydraulic pump, a return line carrying fluid to said reservoir, an accumulator coupled to said supply line for storing a quantity of said fluid substantially at the pressure of said pump; and a tailstock cylinder assembly which comprises a cylinder coupled to said tailstock and having first and second hydraulic connections to be coupled to said supply and return lines; a tailstock valve coupled between said supply and return lines and the hydraulic connections of said cylinder, and having a forward position, a neutral position, and a home position, a tailstock pressure regulator disposed between said supply line and said valve providing a reduced hydraulic pressure through said valve to said cylinder; pressure sensing means for sensing the hydraulic pressure at said first hydraulic connection of said tailstock cylinder for detecting a pressure drop thereat to indicate contact of the tailstock with said workpiece and supplying a tailstock-in-position signal; and means actuating said tailstock valve in response to said tailstock-in-position signal to halt movement of said cylinder when said tailstock contacts said workpiece; and further comprising a bypass valve in parallel with said tailstock pressure regulator for selectively bypassing said regulator to apply full pressure to said tailstock cylinder, and means for momentarily actuating said bypass valve when desired to overcome static function, after which the bypass valve is closed so that said reduced pressure is applied to said cylinder for further travel of said tailstock.

4. The modular hydraulic assembly according to claim 3 wherein said tailstock pressure regulator is selectively adjustable to provide said reduced hydraulic pressure in a range from full pressure down to substantially 50 psi, so that the tailstock can be urged with greater force against large or bulky workpieces or with smaller force against light, delicate workpieces, said bypass valve being effective to overcome static friction even when the selected tailstock pressure is lower than the force required to overcome static friction.

5. Modular hydraulic assembly for an automated machine tooler of the type that has a rotary spindle that carries a collet into which a workpiece can be secured, a tailstock which is movable forward to contact said workpiece and movable away from the workpiece to a home position, a spindle brake which is held out of engagement with said spindle to permit rotation thereof and is urged into braking engagement with said spindle to halt said rotation, and a rotary tool turret for holding a plurality of tools at respective rotary positions thereon, said turret being rotatable to bring a desired one of said tools into position to machine said workpiece, including a turret clamp which is movable between an unlock position to permit rotation of the turret and a lock position to hold the turret against rotation; said modular hydraulic assembly comprising a hydraulic circuit which includes a reservoir, a hydraulic pump, a pressure supply line carrying pressurized hydraulic fluid from said hydraulic pump, a return line carrying fluid to said reservoir, an accumulator coupled to said supply line for storing a quantity of said fluid substantially at the pressure of said pump; and a tailstock cylinder assembly which comprises a cylinder coupled to said tailstock and having first and second hydraulic connections to be coupled to said supply and return lines; a tailstock valve coupled between said supply and return lines and the hydraulic connections of said cylinder, and having a forward position, a neutral position, and a home position, a tailstock pressure regulator disposed between said supply line and said valve providing a reduced hydraulic pressure through said valve to said cylinder; pressure sensing means for sensing the hydraulic pressure at said first hydraulic connection of said tailstock cylinder for detecting a pressure drop thereat indicate contact of the tailstock with said workpiece and said supplying a tailstock-in-position signal; means actuating said tailstock valve in response to said tailstock-in-position signal to halt movement of said cylinder when said tailstock contacts said workpiece; and further comprising an adjustable resistance orifice between said tailstock valve and said return line which limits the travel speed of said tailstock cylinder by controlling resistance to return flow from the cylinder, a bypass valve in parallel with said adjustable resistance orifice, and means for actuating said bypass valve when said cylinder and said tailstock move from the forward position towards the home position to permit rapid return to home.

* * * * *